(12) United States Patent
Hercey et al.

(10) Patent No.: US 6,564,554 B2
(45) Date of Patent: May 20, 2003

(54) METHOD AND APPARATUS TO CONTROL A TURBOCHARGER WASTEGATE USING EXHAUST PRESSURE

(75) Inventors: Robert L. Hercey, Peoria, IL (US); Donald W. Heston, Chillicothe, IL (US); David L. Lehman, Metamora, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/924,028

(22) Filed: Aug. 7, 2001

(65) Prior Publication Data

US 2003/0029168 A1 Feb. 13, 2003

(51) Int. Cl.⁷ ............................................. F02D 23/00
(52) U.S. Cl. ..................................................... 60/602
(58) Field of Search ........................................... 60/602

(56) References Cited

U.S. PATENT DOCUMENTS 3,576,102 A  *  4/1971  West ........................... 60/602
4,084,378 A      4/1978  Blake
4,254,625 A  *  3/1981  Bergstedt et al. ............. 60/602
4,336,688 A  *  6/1982  Dellis ........................... 60/602
4,483,146 A     11/1984  Morikawa
4,499,731 A      2/1985  Moser
5,199,260 A      4/1993  Iwick
5,205,125 A      4/1993  Potter
5,755,101 A      5/1998  Free et al.
6,085,525 A      7/2000  Hakansson

* cited by examiner

Primary Examiner—Thomas Denion
Assistant Examiner—Thai-Ba Trieu
(74) Attorney, Agent, or Firm—Tom L Derry

(57) ABSTRACT

Engines having turbochargers with a mechanically actuated wastegate typically control the wastegate in response to the air pressure at an outlet of a compressor portion of the turbocharger. Some engine configurations don't provide enough compressor outlet pressure variation to suitably control the wastegate. In the present invention, a control strategy is provided for opening and closing a wastegate based on exhaust gas pressure.

17 Claims, 3 Drawing Sheets

METHOD AND APPARATUS TO CONTROL A TURBOCHARGER WASTEGATE USING EXHAUST PRESSURE

TECHNICAL FIELD

The present invention relates generally to an internal combustion engine having an exhaust driven turbocharger and more particularly to control a wastegate in response to pressure in an exhaust system.

BACKGROUND

Due to desired performance characteristics of internal combustion engines, exhaust gas driven turbochargers must be regulated to achieve desired charge-air pressures over a wide range of engine speeds. Charge air pressure is related to turbocharger speed and turbocharger speed is related to the flow of an exhaust gas stream through a turbine portion of the turbocharger. Many exhaust driven turbochargers include a wastegate that permits a portion of the exhaust gas stream of the engine to bypass the turbine portion.

Typical exhaust driven turbochargers have a pressure responsive canister control module that is operably connected to the wastegate. The canister control module includes a movable diaphragm (or piston) having a linkage and a spring or biasing member. The piston is exposed to atmospheric pressure and the spring on one side and a charge air pressure on the other side. As the charge air pressure increases beyond a predetermined value, the piston and linkage are moved toward the biasing member, causing the wastegate to open, in turn slowing the turbocharger.

However, some internal combustion engines, such as those used in some large work machines, are configured to operate in a manner that may prevent this type of control strategy from working well. One such example is, an internal combustion engine configured to have a high torque rise in relation to engine speed. In other words, the engine is configured so that as the engine speed is decreased, the output torque of the engine is increased at a faster than normal rate. To help increase the torque at a faster rate, the turbocharger is configured to provide higher charge air pressure at lower engine speed.

One disadvantage with this type of engine configuration is that the charge air pressure does not vary much over the normal operating range of engine speed. Due to the lack of charge air pressure variation, wastegate control strategies based on charge air pressure may not provide enough control of the turbocharger. This may cause the turbocharger to operate at extremely high speeds, resulting in damage or reduced turbocharger life.

One example of a control system that does not use charge air to control the wastegate is U.S. Pat. No. 5,205,125 issued to General Motors Corporation on Apr. 27, 1993. In this system the wastegate is controlled by the pressure of the exhaust pushing the wastegate open. Additionally, the wastegate assembly includes an adjustable biasing mechanism to control how much pressure is required to open the wastegate.

One possible problem related to using exhaust pressure to control the wastegate is that exhaust pressure fluctuates greatly as each exhaust valve opens. Also, the temperature of exhaust gas is much higher than that of charge air exiting the compressor portion. Existing canister control modules may not operate with the extreme temperatures of exhaust gas. Particulates in the exhaust gas may build up in a control mechanism and reduce dependability of the control system.

This invention is directed to overcoming one or more of the above identified problems.

SUMMARY OF THE INVENTION

In an aspect of the present invention, a mechanism is provided for controlling the wastegate of a turbocharger. The mechanism includes a canister control module, a conduit having a first end in fluid communication with an exhaust system and a second end in fluid communication with the canister control module. An actuator is positioned in the canister control module and is responsive to pressure from the exhaust system. The actuator being adapted to move the wastegate between a first and a second position, the first position allowing fluid communication between the exhaust system and a turbine portion of the turbocharger and the second position allowing partial bypassing of the turbine portion.

In another aspect of the present invention, a method for controlling a wastegate of a turbocharger is provided. The method includes directing a portion of exhaust gas from an exhaust system to an actuator, exerting a force with the portion of exhaust on the actuator and moving the wastegate to the open position when exhaust gas is above a predetermined pressure.

In yet another aspect of the present invention, is an internal combustion engine having a control mechanism for controlling the wastegate of a turbocharger. The control mechanism includes a canister control module having a pressure region, a conduit in fluid communication with the canister control module and an exhaust system, and an actuator positioned in said canister control module. The actuator is adapted to move the wastegate between a first and a second position, in the first position the wastegate allows fluid communication between an exhaust system and an inlet to a turbine in the turbocharger. In the second position the wastegate permits partial bypassing of the turbine portion.

DETAILED DESCRIPTION

Figure 1:
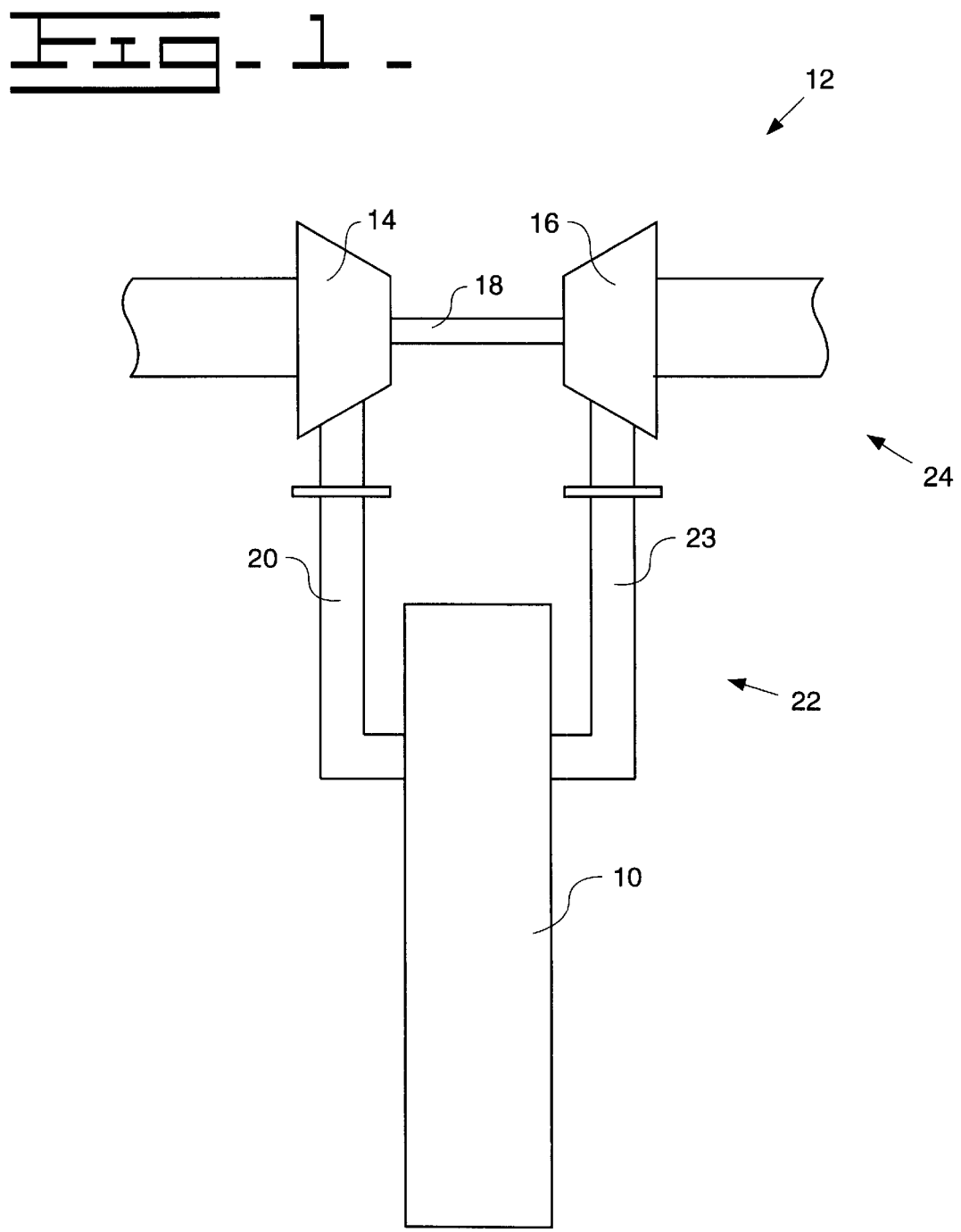
FIG. 1 is a schematic diagram of an internal combustion engine having a turbocharger in accordance with the present invention.

With reference to FIG. 1 an internal combustion engine 10 includes a conventional exhaust driven turbocharger 12 having a compressor portion 14 and a turbine portion 16. The compressor portion 14 includes a compressor wheel (not shown) and the turbine portion 16 includes a turbine wheel (not shown). The compressor wheel and turbine wheel are rotatably coupled by a shaft 18. The compressor portion 14 is fluidly coupled to an intake manifold 20 on the engine and the turbine portion 16 is fluidly coupled to an exhaust system 22 on the engine. The exhaust system 22 typically includes an exhaust manifold 23 and exhaust tube 24.

Figure 2:
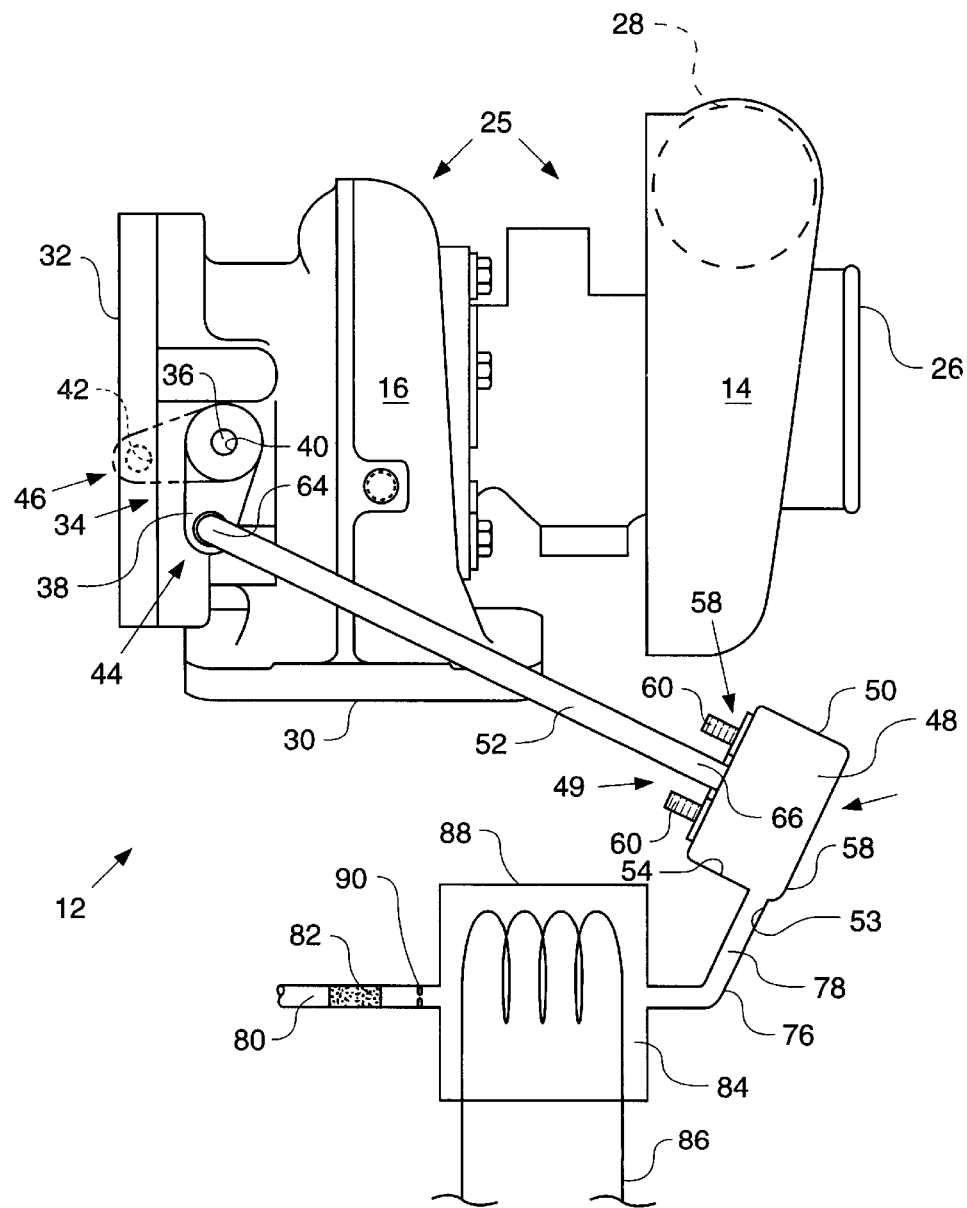
FIG. 2 is an illustration of a turbocharger and the interconnection of a canister control module of the present invention.

With reference to FIG. 2 the turbocharger 12 includes a housing 25 surrounding the compressor portion 14 and a turbine portion 16. The shaft 18 is disposed within the housing 25. The compressor portion 14 further includes an air inlet 26 and an air outlet 28. The air inlet 26 is open to the atmosphere, but an air filter system (not shown) may be provided near the air inlet 26. The air outlet 28 is fluidly coupled to the intake manifold 20. An aftercooler (not shown) may be provided at a location between the air outlet 28 and the intake manifold 20. The turbine portion 16 further includes a turbine inlet 30, a turbine outlet 32 and a conventional wastegate assembly 34. Typically, the turbine inlet 30 is in fluid communication with the exhaust manifold 23, and the turbine outlet 32 is coupled to the exhaust tube 24.

The wastegate assembly 34 is pivotally mounted within the housing 25 on a pin 36 and is moveable between an first (open) position and a second (closed) position. The pin 36 extends outside of the housing 25 and a bell crank 38 is externally coupled to the pin 36. The bell crank 38 includes a first bore 40 that engages the pin 36 and second bore 42 positioned at a predetermined distance from the first bore 40. The bell crank 38 is movable between a first position 44 and a second position 46. First position 44 relates to, wastegate assembly 34 closed, and second position 46 relates to wastegate assembly 34 open.

A canister control module 48 is mounted on the engine 10 or the turbocharger 12. The canister control module 48 includes a body 50, an actuator 49 or a piston 51, a control linkage 52 attached to the piston 51, and an inlet port 53. The body 50 includes a cylindrical wall portion 54, a first end 56 and a second end 58. The first end 56 is closed and includes the inlet port 53. The second end 58 is open to the atmosphere and may include a pair of mounting studs 60. The mounting studs 60 are adapted to fasten to a common mounting bracket (not shown). It should be noted, that any conventional mounting arrangement may be substituted for the one described without departing from the scope of the present invention. The control linkage 52 extends through the second end 58 of the canister control 48 and is adapted on a first end 64 to pivotally engage the second bore 42 of the bell crank 38.

Figure 3:
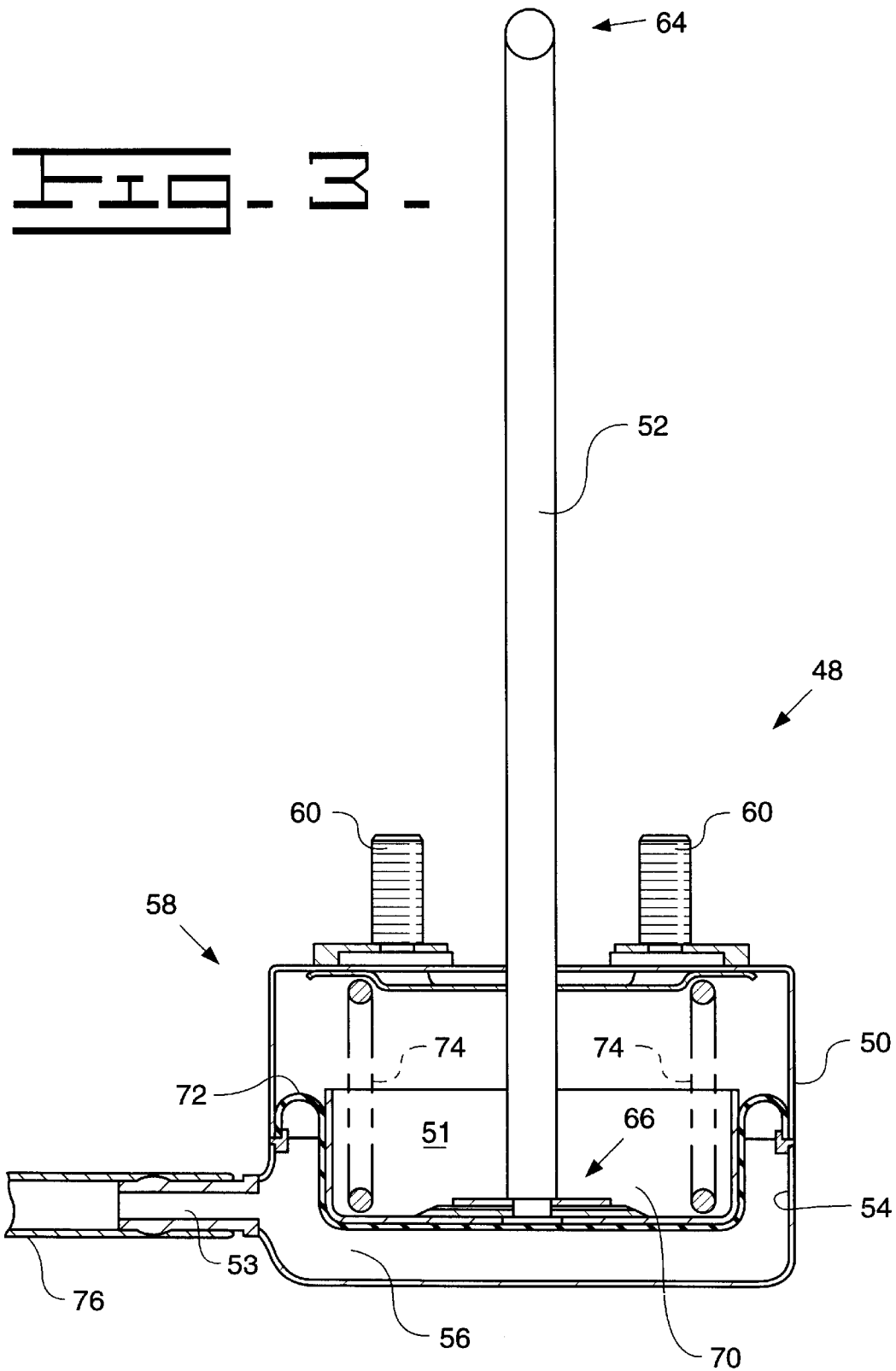
FIG. 3 is a sectional view of a canister control module and related pressure communication components as embodied in the present invention.

With reference to FIG. 3, a sectional view of the canister control 48 is illustrated. The control linkage 52 has a second end 66 attached to the piston 51. The piston 51 is disposed within the cylindrical wall portion 54 of the canister control 48. The piston 51 is moveable between a first position 70 and a second position (not shown) near the second end 58 of the body 50. A diaphragm 72 or seal is disposed between the piston 51 and the cylindrical wall portion 54 of the body 50. The diaphragm 72 or seal isolates the first end 56 of the body 50 from the second end 58. A spring 74, or alternate biasing member, is positioned between the second end 58 of the body 50 and the piston 51. The inlet port 53 of the canister control 48 is adapted to engage a hose 76 or tube in a conventional manner.

As shown in the previous figures, the inlet port 53 of the canister control 48 is fluidly coupled to a hose 76 or tube at a first end 78. A second end 80 of the hose 76 is fluidly coupled to the exhaust system 22.

Within the hose 76, a replaceable porous filter 82 may be disposed. The porous filter 82 may be constructed of stainless steel, ceramic, or any other media capable of withstanding engine exhaust gases. Additionally, a dampening volume 84 and cooling apparatus 86 may be provided within the hose. The dampening volume 84 may be a cylindrical member 88 positioned between the first end 78 and second end 80 of the hose 76. Alternately, the dampening volume 84 may consist of an enlarged diameter portion (not shown) of the hose 76. The cooling apparatus 86 may be provided in a number of conventional manners. One example is through the use of a heat exchanger positioned in the hose, possibly in conjunction with the dampening volume 84. The heat exchanger may be as simple as a tube connected to a supply of engine coolant at a first end and connected to a radiator return line at a second end. Alternately, the cooling apparatus may be provided by having an extended portion of the hose 76 or tube exposed to an air stream having a cool temperature relative to the exhaust. An orifice 90 is additionally positioned in line with the hose 76, preferably located between the filter 82 and dampening volume 84.

INDUSTRIAL APPLICABILITY

In operation, exhaust gas from the engine 10 is directed to the turbine portion 16, additionally exhaust gas is directed to the canister control 48 by way of the hose 76 (or conduit). The exhaust gas enters the canister control 48 through the inlet port 53 and acts on the piston 51. As the pressure of the exhaust gas increases sufficiently to overcome the combined force of the spring 74 and atmospheric pressure, the piston 51 moves toward the second end 58 of the canister control 48. The control linkage 52 moves with the piston 51 and causes the bell crank 38 to rotate, which in turn opens the wastegate assembly 34. Opening of the wastegate 34 allows a portion of the exhaust gas to bypass the turbine portion 16, thus slowing the speed of the turbocharger 12.

To compensate for fluctuations of exhaust gas pressure due to the opening of and closing of exhaust valves, an orifice 90 and dampening volume 84 may be included in the hose 76 between the exhaust system 22 and inlet port 53. The orifice 90 acts to resist the fluctuations in exhaust gas pressure and the dampening volume 84 serves to absorb fluctuations.

The filter 82 is preferably positioned in the hose 76 nearest to the exhaust system 22 as reasonably possible, the filter 82 prevents particulate matter from entering and further restricting the orifice 90 or other components.

The cooling apparatus 86 functions to cool the exhaust gas temperature down stream of the cooling apparatus 86. Reduced exhaust gas temperature may help prevent damage or wear to components such as the canister control 48 module.

What is claimed is:

1. A control mechanism for controlling a wastegate of a turbocharger on an internal combustion engine, said control mechanism comprising:

a canister control module having a pressure region;

a conduit having a dampening volume, a first end portion and a second end portion, said second end portion in fluid communication with an exhaust system on said internal combustion engine, said first end portion in fluid communication with said pressure region of said canister control module;

an actuator positioned in said canister control module, said actuator being responsive to said pressure region, said actuator being adapted to move said wastegate valve between a first position and a second position, said first position allowing fluid communication between said exhaust system and an inlet to a turbine for said turbocharger, said second position permitting partial bypassing of said exhaust system past said turbine; and a dampening volume disposed between said exhaust system and said first pressure region.

2. The control mechanism of claim 1, including an orifice positioned in said conduit between said exhaust system and said canister control module.

3. The control mechanism of claim 1, including a cooling apparatus intermediate said exhaust system and said canister control module.

4. The control mechanism of claim 3, wherein said cooling apparatus is a heat exchanger arrangement.

5. The control mechanism of claim 3, wherein said cooling apparatus is an extended portion of said conduit.

6. The control mechanism of claim 1 said actuator comprising:
   a piston;
   a diaphragm positioned between said pressure region and a second end of said canister control; and
   a control linkage connected with said piston opposite said pressure region, said linkage being connected with said wastegate.

7. The control mechanism of claim 6 wherein said actuator includes a spring biasing said piston toward said pressure region.

8. The control mechanism of claim 1, including a filter connected intermediate said canister control and said exhaust system.

9. The control mechanism of claim 8 wherein said filter is constructed of stainless steel.

10. A method for controlling the wastegate of a turbocharger for an internal combustion engine, said method comprising the steps of:
    directing a portion of exhaust gas from an exhaust system to an actuator;
    exerting a force with said portion of said exhaust gas on said actuator;
    moving said wastegate to an open position where said portion of exhaust gas is above a first predetermined pressure;
    moving said waste gate toward a closed position when said exhaust gas is below a second predetermined pressure; and
    dampening pressure variations of said exhaust gas.

11. The method of claim 10, including the step of blocking particles above a predetermined diameter upstream of said canister.

12. The method of claim 10, including the step of cooling said exhaust gas upstream of said canister control.

13. An internal combustion engine having a control mechanism for controlling a wastegate of a turbocharger, said control mechanism comprising:
    a canister control module having a pressure region;
    a conduit having a first end and a second end, said second end in fluid communication with an exhaust system on said internal combustion engine, said first end in fluid communication with said pressure region of said canister control module;
    an actuator positioned in said canister control module, said actuator being responsive to said first pressure region, said actuator being adapted to move said wastegate between a first position and a second position, said first position allowing fluid communication between said exhaust system and an inlet to a turbine for said turbocharger, said second position permitting partial bypassing of the turbine; and
    a dampening volume disposed between said exhaust and said pressure region.

14. The internal combustion engine of claim 13, including an orifice positioned in said conduit between said exhaust system and said canister control module.

15. The internal combustion engine of claim 13, including a cooling apparatus intermediate of said exhaust system and said canister control module.

16. The internal combustion engine of claim 15, wherein said cooling apparatus is a heat exchanger arrangement.

17. The apparatus of claim 13 including a porous filter apparatus position between said outlet port of said exhaust manifold and said inlet port of said canister control.

* * * * *